United States Patent
Nagamine

(10) Patent No.: US 11,797,240 B2
(45) Date of Patent: Oct. 24, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Keisuke Nagamine, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/723,616

(22) Filed: Apr. 19, 2022

(65) Prior Publication Data
US 2022/0334779 A1   Oct. 20, 2022

(30) Foreign Application Priority Data
Apr. 19, 2021   (JP) ................. 2021-070475

(51) Int. Cl.
*G06F 3/12* (2006.01)
*G06K 15/10* (2006.01)
*H04N 1/46* (2006.01)

(52) U.S. Cl.
CPC .......... *G06F 3/1208* (2013.01); *G06F 3/1242* (2013.01); *G06F 3/1256* (2013.01); *G06K 15/102* (2013.01); *H04N 1/46* (2013.01)

(58) Field of Classification Search
CPC .... G06F 3/1208; G06F 3/1242; G06F 3/1256; G06F 3/1253; G06F 3/1285; G06F 3/125; G06K 15/102; H04N 1/387; H04N 1/00397; H04N 1/00472; H04N 1/393; H04N 1/46

USPC ........................................... 358/1.8
See application file for complete search history.

(56) References Cited

U.S. PATENT DOCUMENTS 8,503,023 B2 *   8/2013   Nishide ............... H04N 1/6052
                                                             358/1.18
2018/0081602 A1   3/2018   Ueda

FOREIGN PATENT DOCUMENTS

JP   2011-044866 A   3/2011
JP   2020-052291 A   4/2020

OTHER PUBLICATIONS

Oct. 4, 2022 European Search Report in European Patent Appln. No. 22168323.8.

* cited by examiner

*Primary Examiner* — Darryl V Dottin
(74) *Attorney, Agent, or Firm* — Venable LLP

(57) ABSTRACT

At least one of the first notification and the second notification is provided via a display device, based on a fact that, by the editing of an object, an object with a transmission property is overlapped on the front surface of an object to be printed by use of a spot color ink, the first notification being provided for warning that the object with the transmission property is in a state of being overlapped on the front surface of the object to be printed by use of the spot color ink, the second notification being provided for asking whether or not a predetermined overlapping state in which the object with the transmission property is overlapped on the front surface of the object to be printed by use of the spot color ink is to be maintained.

15 Claims, 10 Drawing Sheets

INFORMATION PROCESSING APPARATUS, INFORMATION PROCESSING METHOD, AND STORAGE MEDIUM

BACKGROUND OF THE INVENTION

Field of the Invention

The present invention relates to an information processing method, an information processing apparatus, and a storage medium for editing an image to be printed by use of an ink that expresses a spot color such as a fluorescent color or a metallic color.

Japanese Patent Laid-Open No. 2011-044866 discloses a technique for allowing a user to recognize an area of an image to be printed with a spot color ink, which is an ink of a spot color such as a metallic color, before printing is performed by a printing apparatus. Specifically, in Japanese Patent Laid-Open No. 2011-044866, regarding images to be printed by use of spot color inks, an image including an area to be printed with a spot color ink and an area to be printed with a normal ink and an image only including an area to be printed with a normal ink are printed in advance or displayed on a display device. Note that, since a display device or the like cannot display the colors reproduced by spot color inks, the colors are displayed based on preset color information which can be displayed on the display device or the like.

It is desired to suppress the occurrence of an output result that is not intended by the user.

SUMMARY OF THE INVENTION

The present invention has been made in view of the above-described problems, so as to provide a technique capable of suppressing the occurrence of an output result that is not intended by the user.

In the first aspect of the present invention, there is provided an information processing method including:

an editing step in which an object that is displayed on a display device can be edited;

a display control step in which the displaying on the display device is changed based on contents of the editing in the editing step; and a notification step in which at least one of a first notification and a second notification is provided via the display device, based on a fact that, by the editing of the object in the editing step, an object with a transmission property is overlapped on a front surface of an object to be printed by use of a spot color ink, the first notification being provided for warning that the object with the transmission property is in a state of being overlapped on the front surface of the object to be printed by use of the spot color ink, the second notification being provided for asking whether or not a predetermined overlapping state in which the object with the transmission property is overlapped on the front surface of the object to be printed by use of the spot color ink is to be maintained.

In the second aspect of the present invention, there is provided an information processing apparatus including:

an editing unit configured to be capable of editing an object that is displayed on a display device;

a display control unit configured to change the displaying on the display device, based on contents of the editing by the editing unit: and a notification unit configured to provide at least one of a first notification and a second notification via the display device, based on a fact that, by the editing of the object by the editing unit, an object with a transmission property is overlapped on a front surface of an object to be printed by use of a spot color ink, the first notification being provided for warning that the object with the transmission property is in a state of being overlapped on the front surface of the object to be printed by use of the spot color ink, the second notification being provided for asking whether or not a predetermined overlapping state in which the object with the transmission property is overlapped on the front surface of the object to be printed by use of the spot color ink is to be maintained.

In the third aspect of the present invention, there is provided a non-transitory computer readable storage medium storing a program for causing a computer to function as an information processing apparatus, the information processing apparatus including:

an editing unit configured to be capable of editing an object that is displayed on a display device;

a display control unit configured to change the displaying on the display device, based on contents of the editing by the editing unit; and a notification unit configured to provide at least one of a first notification and a second notification via the display device, based on a fact that, by the editing of the object by the editing unit, an object with a transmission property is overlapped on a front surface of an object to be printed by use of a spot color ink, the first notification being provided for warning that the object with the transmission property is in a state of being overlapped on the front surface of the object to be printed by use of the spot color ink, the second notification being provided for asking whether or not a predetermined overlapping state in which the object with the transmission property is overlapped on the front surface of the object to be printed by use of the spot color ink is to be maintained.

According to the present invention, it becomes possible to suppress the occurrence of an output result that is not intended by the user.

Further features of the present invention will become apparent from the following description of exemplary embodiments with reference to the attached drawings.

DESCRIPTION OF THE EMBODIMENTS

Hereinafter, with reference to the attached drawings, explanations will be given of the examples of an embodiment of an information processing apparatus, an information processing method, and a storage medium. Note that it is not intended that the following embodiments limit the present invention, and every combination of the characteristics explained in the present embodiments is not necessarily essential to the solution in the present invention. Further, the relative positions, shapes, etc., of the configurations described in the embodiments are merely examples and are not intended to limit this invention to the range of the examples.

First Embodiment

First, with reference to FIG. 1 to FIG. 4B and FIG. 9, an explanation will be given of an information processing apparatus according to the first embodiment. The information processing apparatus according to the present embodiment is configured to be connected to a printing apparatus that performs printing on a print medium, so as to be able to execute various kinds of editing, such as changing the arrangement position of an object, enlarging or reducing an object, and adding or deleting an object, on an image to be printed by the printing apparatus. Note that, although the case in which the information processing apparatus and the printing apparatus are installed separately will be explained in the present embodiment, such a configuration in which a control part or the like of the printing apparatus has each function of the information processing apparatus explained below is also possible.

<Configuration of the Information Processing Apparatus>

Figure 1:
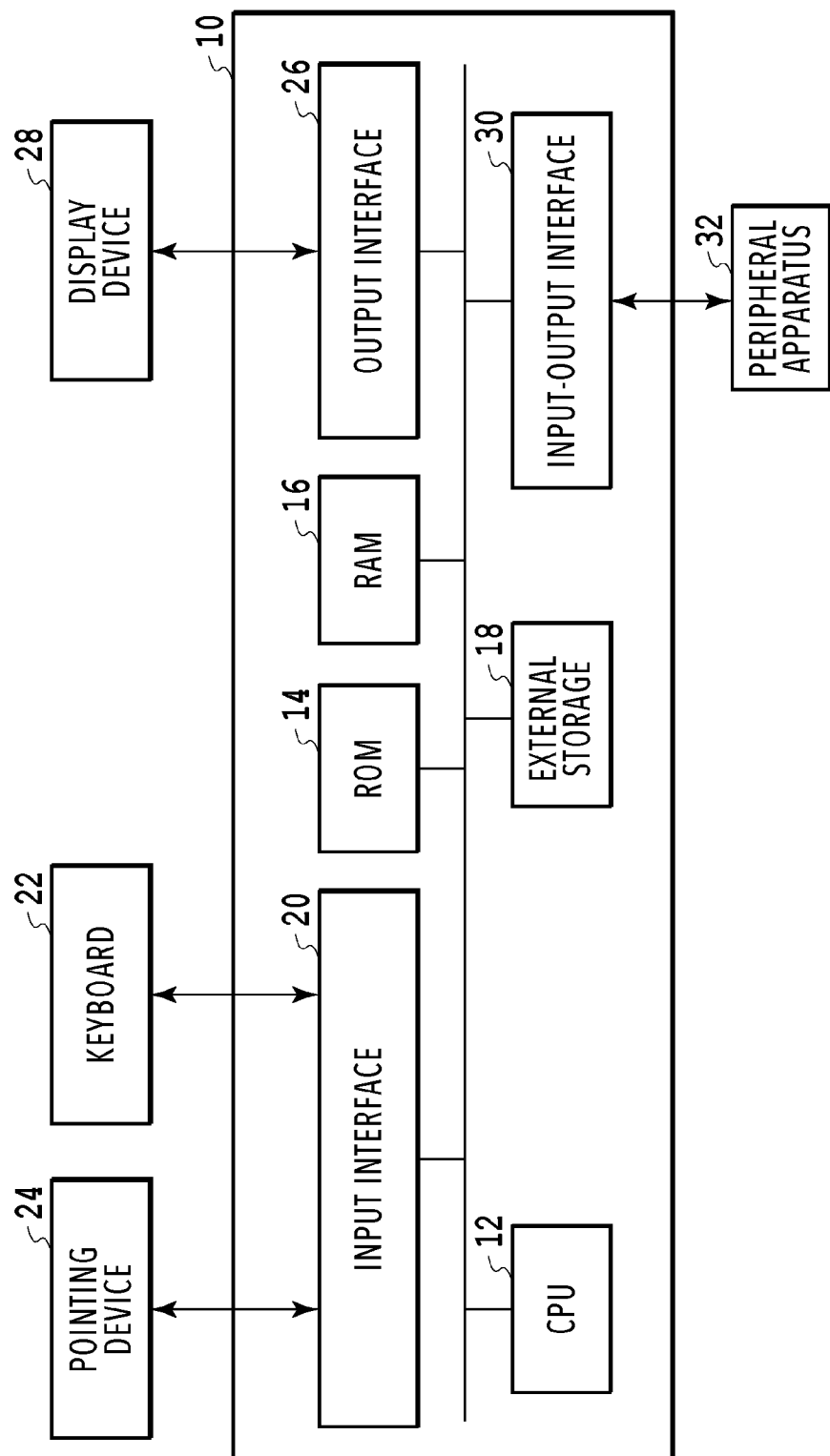
FIG. 1 is a block configuration diagram illustrating an outline of an information processing apparatus according to an embodiment.

FIG. 1 is a block configuration diagram illustrating an outline of the information processing apparatus according to an embodiment. For example, the information processing apparatus 10 of FIG. 1 is configured with a general-purpose personal computer and includes the central processing unit (CPU) 12, the ROM 14, the RAM 16, and the external storage device 18. The CPU 12 controls the entire information processing apparatus 10 such as executing programs and activating hardware. The ROM 14 stores fixed data such as a control program, a data table, an embedded operating system (OS), and a program to be executed by the CPU 12. In the present embodiment, software execution controls such as scheduling, task switching, and interruption processing are performed with each control program stored in the ROM 14 under the control of the OS stored in the ROM 14.

The RAM 16 is configured with a SRAM (Static Random Access Memory), a DRAM (Dynamic Random Access Memory), or the like which requires a backup power supply. Note that data may be held in the RAM 16 by a primary battery for data backup (not illustrated in the drawings). In this case, the RAM 16 can store data such as program control variables without volatilization. Further, the RAM 16 is equipped with a memory area, and, in this memory area, the setting information of the information processing apparatus 10 and the management data of the information processing apparatus 10 are stored. The RAM 16 is also used as the main memory and a work memory of the CPU 12. In the external storage device 18, various applications, contents data handled by these applications, etc., are saved.

The information processing apparatus 10 includes the input interface 20 and is connected to an input device such as the keyboard 22 and the pointing device 24 via this input interface 20. Further, the information processing apparatus 10 includes the output interface 26 and is connected to the display device 28 via this output interface 26. Further, the information processing apparatus 10 includes the input-output interface 30 and is connected via this input-output interface 30 to the peripheral apparatus 32, which is a printing apparatus that performs printing based on the image data that is output from the information processing apparatus 10. The connected printing apparatus is configured to be capable of printing by use of a spot color ink (which will be described later). With these configurations, it is possible for the user to input commands and various kinds of information by use of an input device such as the keyboard 22 and the pointing device 24 while checking the contents displayed on the display device 28.

As the display device 28, various publicly-known display devices such as an LED (Light Emitting Diode) and an LCD (Liquid Crystal Display) can be used. Further, the display device 28 displays various kinds of information and provides notifications of the state of the information processing apparatus 10, etc. Note that such a form in which a soft keyboard equipped with various kinds of keys such as a numeral input key, a mode setting key, a determination key, a cancel key, or a power supply key is installed on the display device 28 so that an input from the user is accepted via the display device 28 is also possible. The contents displayed on the display device 28 are controlled by the CPU 12. As described above, in the present embodiment, the CPU 12 functions as a display control part that is capable of changing the displaying of the display device 28.

<Print System>

Figure 9:
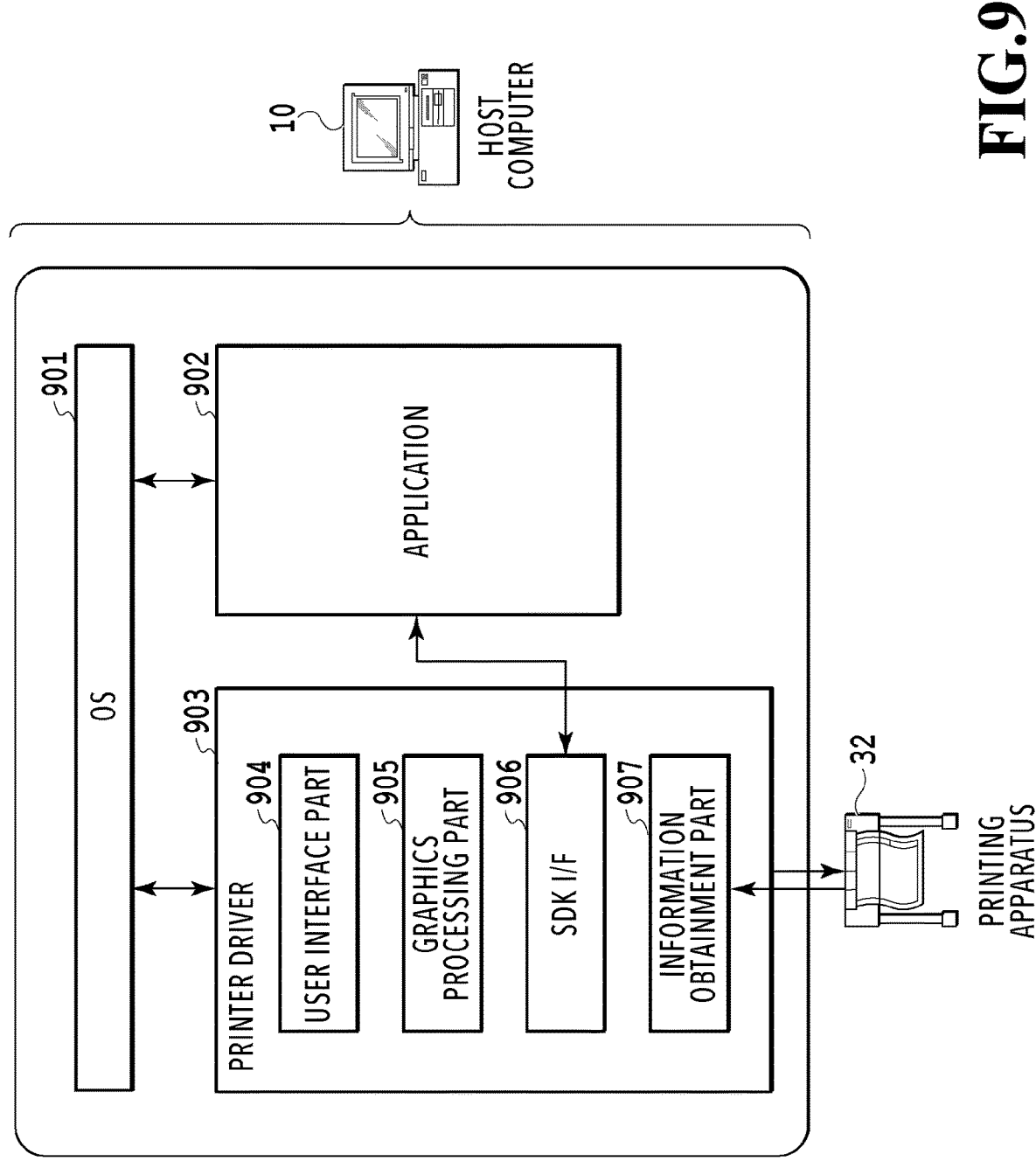
FIG. 9 is a block configuration diagram illustrating a print system that performs spot color printing.

FIG. 9 is a block diagram illustrating a configuration of a print system that performs spot color printing. Note that the spot color printing is printing using inks of spot colors (hereinafter referred to as "spot color ink") other than normal inks. Further, the "normal inks" are a cyan ink, magenta ink, yellow ink, black ink, and the like which are used in a general printing apparatus. In the present embodiment, a fluorescent pink ink is used as the spot color ink. However, the present embodiment is not limited to this form, and the number and colors of spot color inks may be arbitrary. Further, colors other than fluorescent colors are also possible. For example, a violet ink, green ink, orange ink, gold ink, and silver ink may be used as the spot color ink. Further, inks of other metallic colors may be used. Further, an ink in which a spot color ink and another ink (for example, a normal ink) are blended may also be used as a spot color ink.

The information processing apparatus 10 has the OS 901, the application program (hereinafter, application) 902, and the printer driver 903 as software (programs). The application 902 is software for creating the contents to be printed and corresponds to an image editing application for creating poster data, for example. On the application 902, the user designates specific RGB data values regarding the characters or graphics print data for which it is desired to perform the later-described spot color printing. Upon receiving a print request from the user, the application 902 issues a print instruction to the OS 901. Upon receiving the print instruction, the OS 901 entrusts the subsequent processing related to printing to an OS print system (not illustrated in the drawings) installed in itself. Here, the following explanation will be given on the premise that the OS print system operates in cooperation with the printer driver 903 provided by a printing apparatus vendor.

Upon receiving a request for displaying the print setting screen from the application 902, the OS print system requests the printer driver 903 to display the print setting screen, and the printer driver 903 displays the print setting screen on the user interface part 904. On the print setting screen, it is possible to designate the paper size, paper type, etc., and designate the spot color printing. In a case of performing the spot color printing, the user first selects the spot color to be used in the print settings of the printer driver 903. Thereafter, the contents are created on the application 902, and the RGB data values corresponding to the usage of the above-described spot color ink are designated for the characters and graphics prim data for which it is desired to use the spot color ink.

The printer driver 903 provides the SDK (Software Development Kit) I/F 906. By use of the SDK I/F 906, the application 902 can perform print settings on the application 902 without opening the print setting screen of the printer driver 903. Further, with the information obtainment part 907, it is possible for the printer driver 903 to obtain information of the peripheral apparatus 32. Based on the information obtained from the peripheral apparatus 32, the printer driver 903 can display the settings corresponding to the functions of the peripheral apparatus 32 on the user interface part 904 and support the settings with the SDK I/F 906.

With the print instruction from the application 902, the print data and the print settings of the application 902 are transmitted to the graphics processing part 905 of the printer driver 903 via the OS print system. The graphics processing part 905 converts these data into a data format that can be interpreted by the peripheral apparatus 32 and sends the data to the peripheral apparatus 32 as a print job. Thereafter, ink is ejected from the printing head of the peripheral apparatus 32 onto the print medium which is fed to the peripheral apparatus 32, so as to form an image. Here, in a case where the spot color printing is set, ink of the spot color is ejected for the pixels of the designated RGB values of the print data for which printing with the spot color is designated.

Here, an explanation will be given of the example of the peripheral apparatus 32 that uses spot color inks in a case where the spot color printing is set by the printer driver 903 and is capable of performing printing with the six predetermined types of colors using the spot colors. In a case where the spot color printing is set by the printer driver 903, the pixels having a specific RGB value corresponding to the set spot color in the print data will be printed by use of the spot color ink. In the present embodiment, specific RGB values are assigned to the six predetermined kinds of colors, respectively. In the present embodiment, the specific RGB values are, for example, R=255 (0xFF), G=0 (0x00), and B=255 (0xFF), and, by using the fluorescent pink ink for the pixels having those RGB values, the printing will be performed with the fluorescent pink color, which is one of the spot colors. Further, the specific RGB values are, for example, R=255 (0xFF), G=85 (0x55), B=0 (0x00), and, by blending and using the fluorescent pink ink and M and Y inks for the pixels having those RGB values, the printing will be performed with an orange color, which is one of the spot colors. Note that, for example, it is also possible that the printing is performed with the orange color by using an orange ink only in a case of such a form in which the orange ink can be used as a spot color ink. That is, it is sufficient as long as the printing is performed by at least using a spot color ink for the pixels having a specific RGB value corresponding to the spot color, and thus the spot color ink may or may not be blended with CMYK inks for the printing. Note that, even in the spot color printing, the pixels that are not the pixels having a specific RGB value corresponding to a spot color will be printed by use of CMYK inks only. Further, the spot color printing is executed in a case where the spot color printing is enabled by a user operation. That is, in a case where the spot color printing setting is not enabled, the pixels having a specific RGB value corresponding to a spot color will also be printed by use of the CMYK inks only by normally referring to the RGB values.

Specifically, in a case where the printer driver 903 enables the print setting of the spot color of the fluorescent pink and the RGB value of a pixel included in the print data to be sent is R=255, G=0, and B=255, it is possible for the peripheral apparatus 32 to perform the spot color printing of the fluorescent pink. The same applies to other spot colors. That is, in a case where the printer driver 903 enables the print setting of each of the spot colors and the RGB values of pixels included in the print data to be sent are the RGB values corresponding to the respective spot colors, it is possible for the peripheral apparatus 32 to perform the corresponding spot color printing. Note that, on the other hand, in a case where the print data does not include the pixels having the above-described specific RGB values corresponding to spot color printing even though the printer driver 903 enables the spot color printing setting, the spot color printing cannot be performed. It is also possible that a notification of an error (warning) is provided in a case where the spot color printing cannot be performed.

<Monitoring Processing>

In the information processing apparatus 10 having the configuration as explained above, the application 902 for editing image data is activated, so as to perform editing processing such as changing the arrangement position of an object in image data. In the information processing apparatus 10, if the application 902 is activated, the editing screen for editing image data is displayed on the display device 28, and the editing processing will be started. Note that the application 902 is operated by the CPU 12. In the present embodiment, the CPU 12 functions as an editing part that is capable of editing image data.

Further, in the information processing apparatus 10, the monitoring processing, which is for monitoring the overlap between an object to be printed with a spot color ink and an object for which opacity is set, is started in parallel with the editing processing. The monitoring processing is executed by the application 902. Note that the image data that is edited by the editing processing is stored in the external storage device 18 or the like and is appropriately output by the CPU 12 via the input-output interface 30 to the peripheral apparatus 32 such as a printing apparatus for use. As described above, in the present embodiment, the CPU 12 and the input-output interface 30 function as an output part that outputs edited image data to a printing apparatus or the like.

Note that the image data to be the editing target may be created by the information processing apparatus 10 or may be input in advance from another apparatus. Further, in the image data to be the editing target, color information is set for each object and the background, based on the colors expressed at the time of printing. Further, on the editing screen, each object of the image data is colored and displayed based on the set color information. Note that, as for the objects to be printed by use of spot color inks, since the colors expressed by spot color inks cannot be displayed on the display device 28, the colors are displayed with normal colors corresponding to the spot color inks, based on the specific color information (RGB values) that can be displayed on the display device 28. Such specific color information representing spot color inks is preset.

Therefore, on the editing screen, the objects to be printed with normal inks other than the spot color inks are displayed with the colors of the color information corresponding to the inks, and the objects to be printed by use of spot color inks are displayed with the colors based on the specific color information associated with the spot color inks. Accordingly, it is possible for the user to identify an object to be printed by use of a spot color ink (hereinafter appropriately referred to as an "object for which a spot color ink is to be used") on the editing screen.

While checking an image displayed on the editing screen, the user edits the image in various ways. After editing, image data reflecting the edited contents is stored in the external storage device 18 and output to the peripheral apparatus 32. Since it is possible to use publicly-known techniques for setting the color information representing the spot color inks to be displayed on the display device 28 and for editing image data in various ways, detailed explanations thereof will be omitted in the following description. Further, an object for which opacity is set is an object for which the degree of opacity is set, and the object is an object having a transmission degree corresponding to the opacity, that is, an object with a transmission property.

Figure 2:
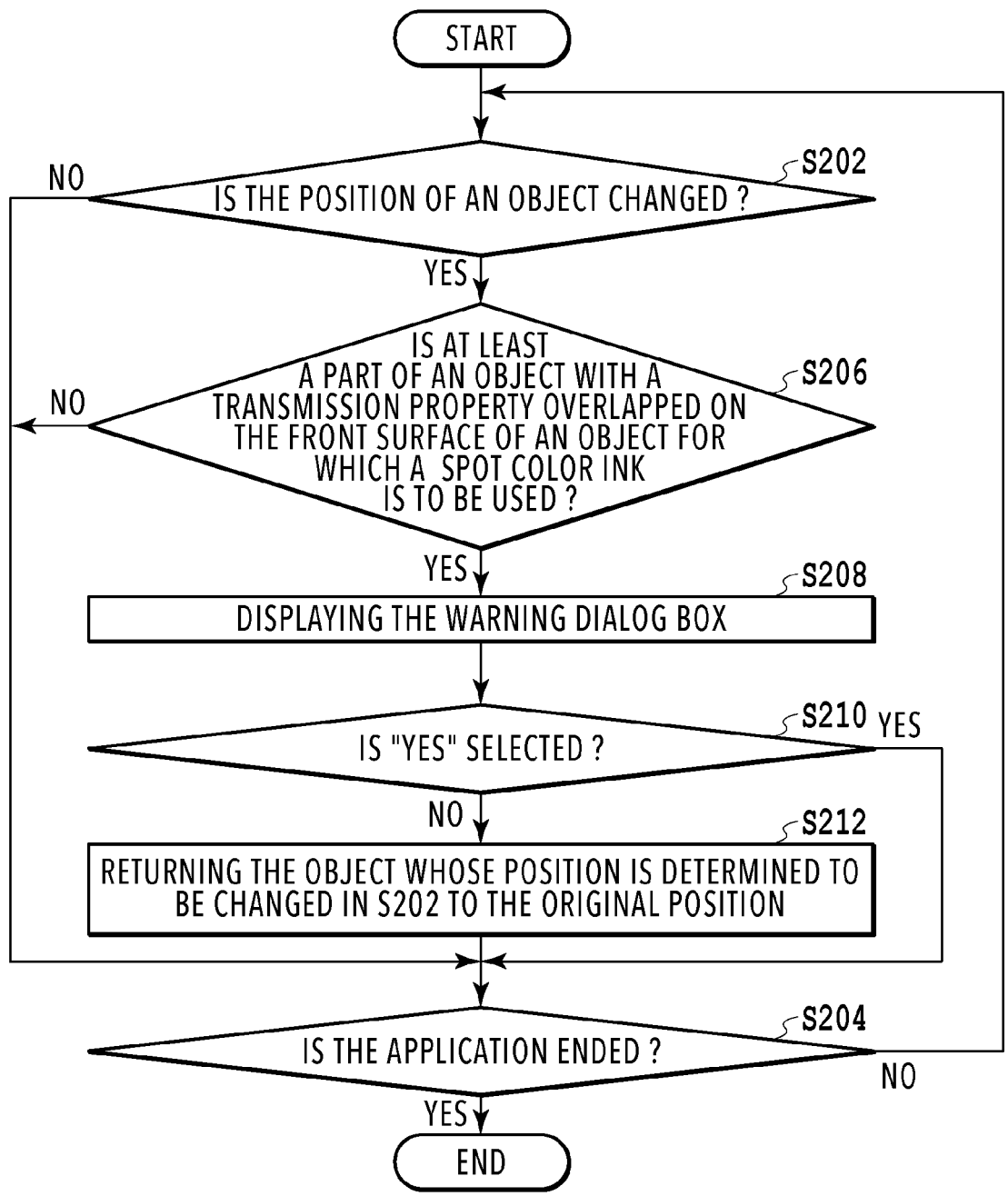
FIG. 2 is a flowchart illustrating a detailed processing routine of monitoring processing.
Figure 3A:
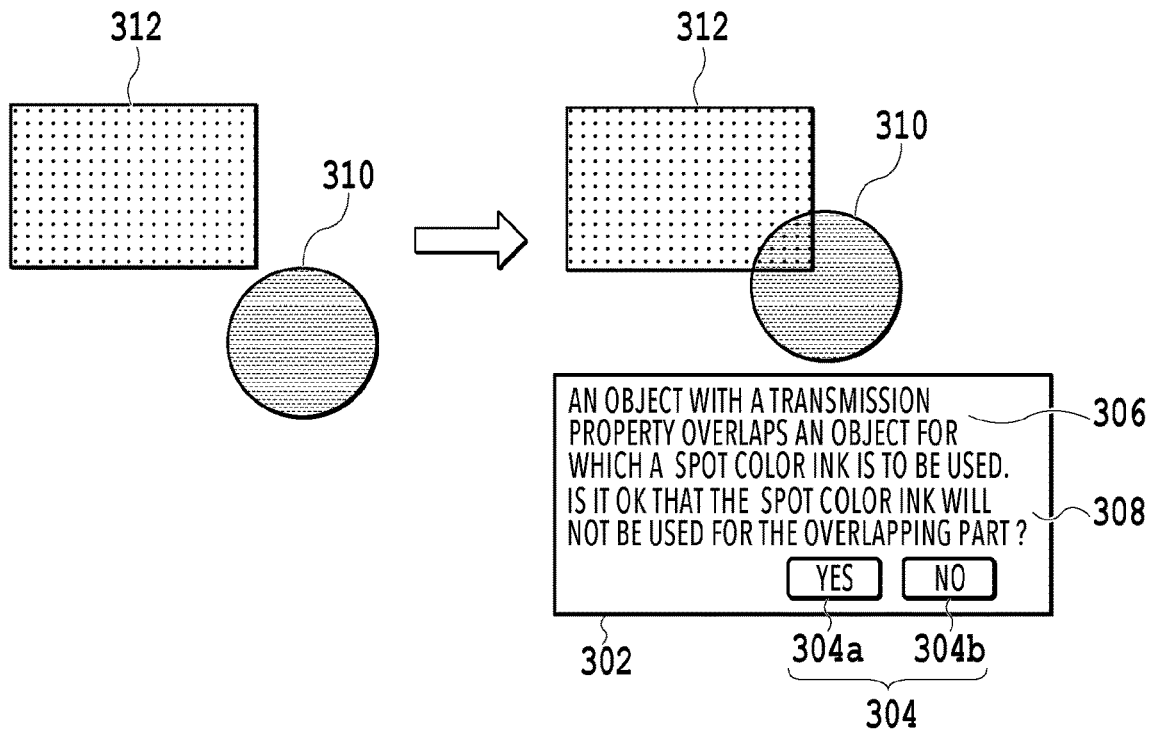
FIG. 3A and FIG. 3B are diagrams illustrating examples in which a warning dialog box is displayed.
Figure 3B:
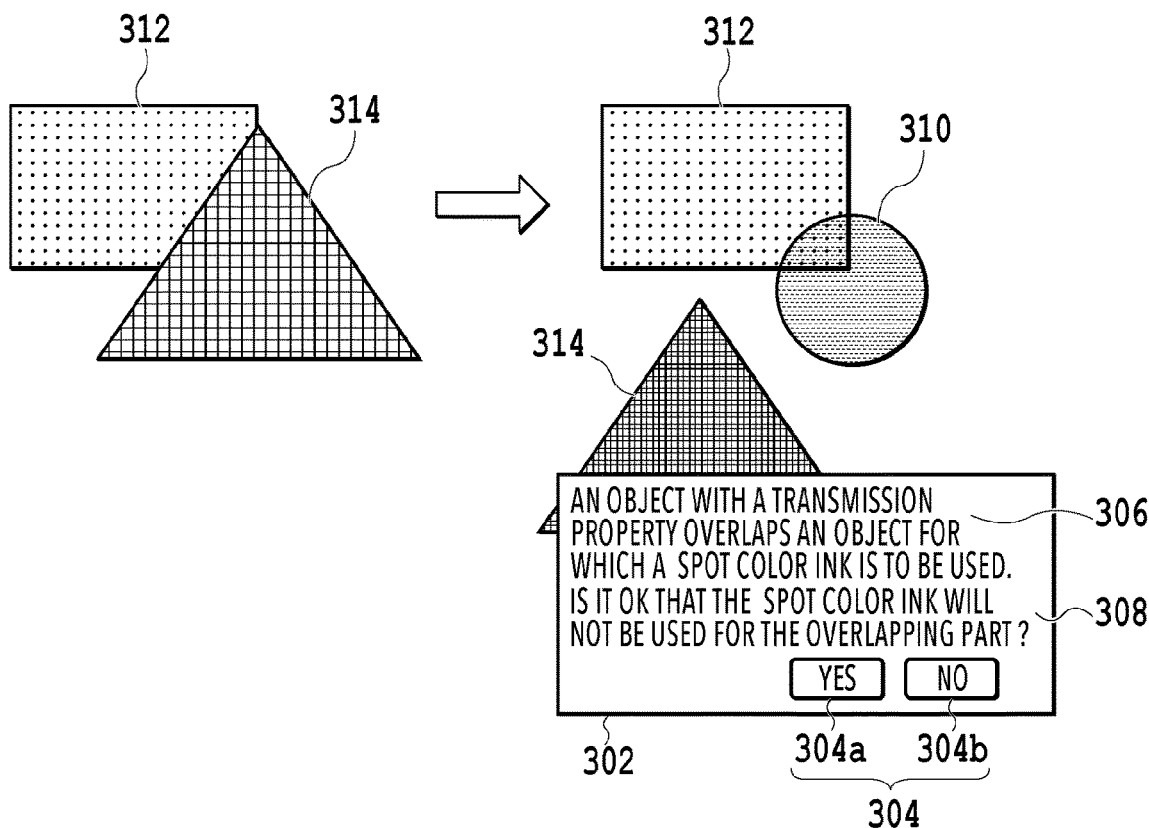
Figure 4A:
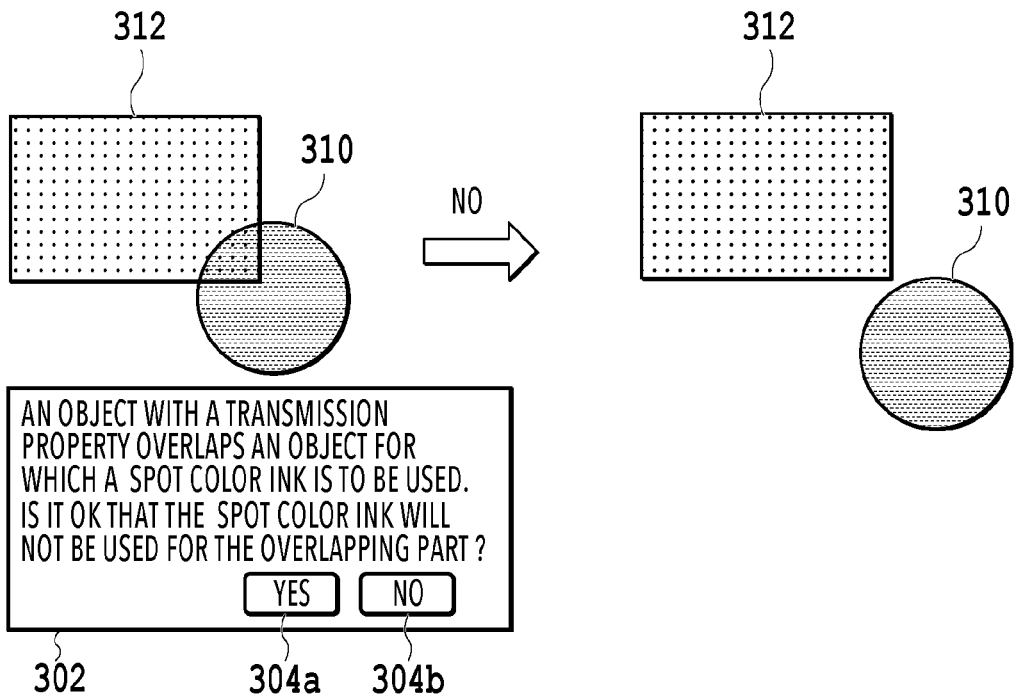
FIG. 4A and FIG. 4B are diagrams for explaining the processes to be performed after the warning dialog box is displayed.
Figure 4B:
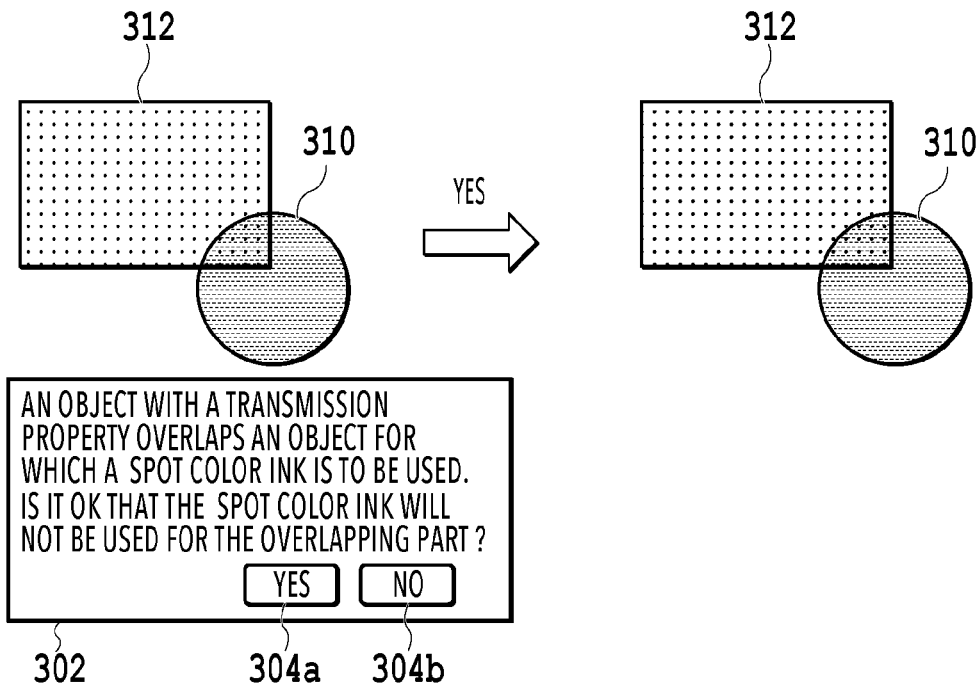

FIG. 2 is a flowchart illustrating a detailed processing routine of the monitoring processing. FIG. 3A and FIG. 3B are diagrams illustrating examples in which a warning dialog box is displayed. FIG. 4A and FIG. 4B are diagrams illustrating the positions of an object after making a selection in the warning dialog box. The position of the object in a case where "NO" is selected is illustrated in FIG. 4A, and the position of the object in a case where "YES" is selected is illustrated in FIG. 4B. The series of the processes illustrated in the flowchart of FIG. 2 is performed by the CPU 12 loading a program code stored in the ROM 14 into the RAM 16 and executing the program code. Alternatively, a part or all of the functions in the steps of FIG. 2 may be executed by hardware such as an ASIC or an electronic circuit. Note that the sign "S" in the explanation of each process means that it is a step of the flowcharts.

If the application 902 is activated and the editing screen is displayed on the display device 28, the information processing apparatus 10 starts the monitoring processing. If the monitoring processing is started, the CPU 12 first determines whether or not the position of an object is changed (S202). In S202, whether or not an object is moved is determined based on an input by an input device such as the keyboard 22 or the pointing device 24.

If it is determined in S202 that the position of an object is not changed, the CPU 12 determines whether or not the application 902 is ended (S204), and, if it is determined that the application 902 is not ended, the processing will return to S202. Further, if it is determined in S204 that the application 902 is ended, this monitoring processing will be ended. Further, if it is determined in S202 that the position of an object is changed, the CPU 12 determines whether or not at least a part of an object with a transmission property is overlapped on the front surface of an "object for which a spot color ink is to be used", according to the change (S206). Specifically, in S206, regarding two objects in an overlapped state after the movement of an object, whether or not the object with a transmission property is arranged on the front side and an "object for which a spot color ink is to be used" is arranged on the back side is determined.

That is, in S206, first, whether or not two objects that overlap each other has occurred due to the movement of an object is determined. At this stage, in a case where the CPU 12 determines that two objects that overlap each other have not occurred, it will be determined as "NO" in S206. In a case where it is determined that two objects that overlap each other have occurred, whether or not one of the two overlapping objects is an object with a transmission property and the other is an "object for which a spot color ink is to be used" will be determined next. At this stage, in a case where the CPU 12 determines that at least one of the two is not an object with a transmission property or at least the other is not an object for which a spot color ink is to be used, it will be determined as "NO" in S206. In a case where it is determined that one of the two is an object with a transmission property and the other is an "object for which a spot color ink is to be used", whether or not the object with a transmission property is arranged on the front side of the "object for which a spot color ink is to be used" will be determined next. At this stage, in a case where the CPU 12 determines that the object with a transmission property is not arranged on the front side of the "object for which a spot color ink is to be used", it will be determined as "NO" in S206.

Therefore, in S206, it will be determined as "YES" if the following three conditions are satisfied. The first condition is that two objects overlapping each other has occurred due to the movement of an object. The second condition is that one of the two overlapping objects is an object with a transmission property and the other is an object for which a spot color ink is to be used. The third condition is that the object with a transmission property is arranged on the front side of the "object for which a spot color ink is to be used". That is, in the present embodiment, for example, in a case where an object with a transmission property is arranged on the front side of an object to be printed by use of a normal ink, it will be determined as "NO" in S206. Further, for example, in a case where an object without transmission property is arranged on the front side of an object without transmission property, it will be determined as "NO" in S206. Further, for example, in a case where an object with a transmission property is arranged on the front side of an "object for which a spot color ink is to be used", it will be determined as "YES" in S206. Further, for example, even if an "object for which a spot color ink is to be used" overlaps an object with a transmission property, in a case where the "object for which a spot color ink is to be used" is arranged on the front side of the object with a transmission property, it will be determined as "NO" in S206. In this way, in the present embodiment, the CPU 12 functions as a detection part that detects whether or not an object with a transmission property is arranged on the front side of an object for which a spot color ink is to be used.

If it is determined as "NO" in S206, the processing will proceed to S204, and a notification process such as S208 will not be executed. Further, if it is determined as "YES" in S206, the CPU 12 executes the notification process (S208). Specifically, the CPU 12 displays the warning dialog box 302 on the editing screen. The reason why the present process is executed will be explained. Here, in the edited image data in which the object with a transmission property is arranged on the front side of the "object for which a spot color ink is to be used" in an overlapping manner, the overlapping part of the two objects may deviate from the color information that is set as the spot color ink at the time of rendering. In this case, in the actual printing, the spot color ink will not be used for the printing of the above-described overlapping part of the two objects. Therefore, there is a case in which the product ends up in a printing result that is not intended by the user.

Therefore, in the present embodiment, in a case of displaying an object with a transmission property in a state of being arranged due to editing (in the present embodiment, the movement of an object) so as to overlap an "object for which a spot color ink is to be used", the warning dialog box 302 will be displayed. For example, as in FIG. 3A, if the object 310 with a transmission property is in a state of being overlapped on the front surface of the object 312 for which a spot color ink is to be used (hereinafter referred to as a predetermined overlapping state) due to the movement of one of the objects, the warning dialog box 302 will be displayed. Further, as in FIG. 3B, if the object 310 which is positioned on the back surface of the object 314 is in a state of being overlapped on the front side of the object 312 due to the movement of the predetermined object 314, the warning dialog box 302 will also be displayed. In this way, in the present embodiment, the CPU 12 functions as a notification part that provides at least one of a notification for warning and a notification for asking whether or not to maintain a predetermined overlapping state via, the warning dialog box 302.

In the warning dialog box 302, the select button 304 for selecting whether or not to maintain the predetermined overlapping state is displayed together with the warning message 306. The warning message 306 displayed in the warning dialog box 302 is a sentence as a notification that an object with a transmission property overlaps an "object for which a spot color ink is to be used". Further, in the warning dialog box 302, the sentence 308 for asking whether or not to maintain the predetermined overlapping state by use of the select button 304 is displayed. Note that, as described above, in a case where the predetermined overlapping state is maintained, the spot color ink will not be used for the part in the predetermined overlapping state. Therefore, the sentence 308 is a sentence for asking whether or not it is ok that the spot color ink will not be used for the part where the two objects overlap. As the select button 304, the "YES" select button 304a and the "NO" select button 304b corresponding to the sentence for asking whether or not to maintain the predetermined overlapping state are displayed.

If the warning dialog box 302 is displayed, the CPU 12 next determines whether or not the "YES" select button 304a is selected (S210). If it is determined in S210 that the "YES" select button 304a is not selected, that is, the "NO" select button 304b is selected, it will be determined that "NO" is selected as for maintaining the predetermined overlapping state. That is, it will be determined that "NO" is selected for not using the spot color ink for the part where the two objects overlap. Then, the CPU 12 disables the executed editing and returns the moved object to the position before the movement (S212), and the processing will proceed to S204. Specifically, in a case where the object 310 with a transmission property is moved to the front surface of the object 312 for which a spot color ink is to be used, the object 310 will be returned to the position before the movement as illustrated in FIG. 4A. Further, in a case where the object 314 is moved in the editing as in FIG. 3B, the object 314 will be returned to the position before the movement.

Further, in S210, if the "YES" select button 304a is selected, the executed editing is enabled, and the state in which the object with a transmission property is overlapped on the front surface of the "object for which a spot color ink is to be used" is maintained, and the processing will proceed to S204. Specifically, the processing will proceed to S204 with the object 310 being overlapped on the front surface of the object 312 as illustrated in FIG. 4B.

As explained above, in the information processing apparatus 10 according to the present embodiment, if at least a part of an object with a transmission property is overlapped on the front surface of an "object for which a spot color ink is to be used" during editing an image, the warning dialog box 302 will be displayed. In this warning dialog box 302, the warning message 306 indicating that an object with a transmission property is overlapped on the front surface of an object for which a spot color ink is to be used and the sentence 308 for asking whether or not it is ok that the spot color ink will not be used for the overlapping part are displayed. Further, in the warning dialog box 302, the "YES" select button 304a and the "NO" select button 304b are displayed as the options associated with the sentence 308. Furthermore, if the "YES" select button 304a is selected, it will be determined that it is confirmed that the spot color ink will not be used for the part of the object for which the spot color ink is to be used overlapping the object with a transmission property, and thus the state in which the two objects overlap will be maintained. Further, if the "NO" select button 304b is selected, it will be determined that it is not confirmed that the spot color ink will not be used for the part of the object for which the spot color ink is to be used overlapping the object with a transmission property, and thus the moved object will be returned to the original position. Accordingly, the information processing apparatus 10 can obtain a printing result that reflects the user's intention regarding an object for which a spot color ink is to be used, in other words, it is possible to suppress the occurrence of a printing result that is not intended by the user.

Note that the contents of the notification process are not limited to the above-described form. For example, it is sufficient as long as the contents of the warning dialog box 302 displayed by the notification process are for notifying the user that at least a part of an object with a transmission property is overlapped on the front surface of an object for which a spot color ink is to be used. Further, for example, it is also possible that the contents are for notifying the user that the part where at least a part of an object with a transmission property is overlapped on the front surface of an object for which a spot color ink is to be used will be printed without using the spot color ink. Further, for example, it is also possible that the contents are for prompting the user to perform an editing operation so that at least a part of the object with a transmission property will not be overlapped on the front surface of the object for which a spot color ink is to be used.

Further, the timing at which the notification process is executed is also not limited to the above-described form. That is, the timing at which the notification process is executed does not have to be the timing at which the position of an object is changed so that at least a part of the object with a transmission property overlaps the front surface of the object for which a spot color ink is to be used. For example, the timing at which a print instruction operation is performed by the user in a state where at least a part of the object with a transmission property overlaps the front surface of the object for which a spot color ink is to be used is also possible. Further, in this form, in a case where "YES" is selected in the warning dialog box, printing will be executed with the predetermined overlapping state being maintained. Furthermore, in a case where "NO" is selected, printing will not be executed and the screen returns to the editing screen.

Further, in the state where at least a part of an object with a transmission property overlaps the front surface of an object for which a spot color ink is to be used, it is also possible that the part of the object for which a spot color ink is to be used on which at least a part of the object with a transmission property overlaps is displayed in a highlighted manner.

Second Embodiment

Figure 5:
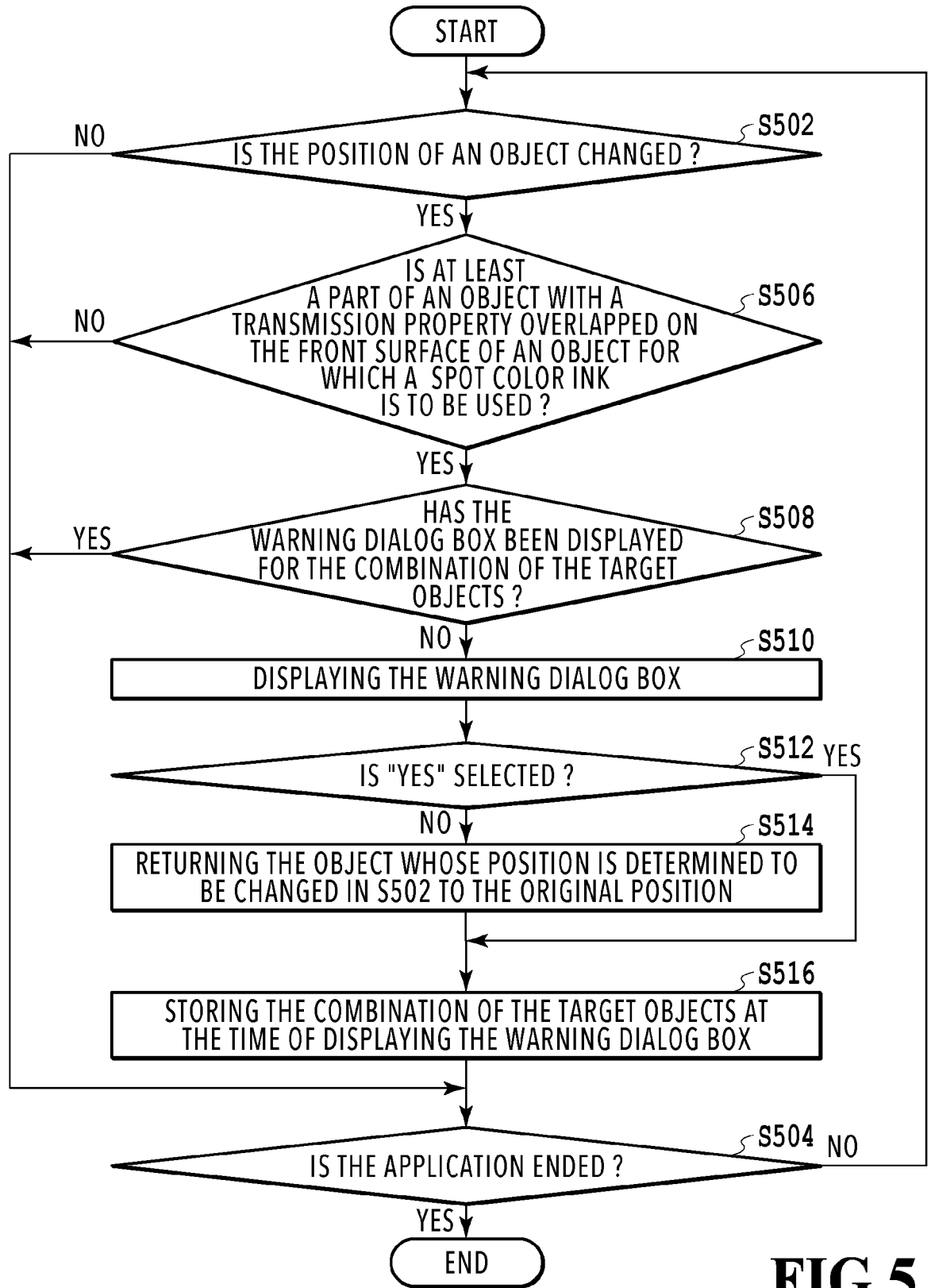
FIG. 5 is a flowchart of monitoring processing performed by an information processing apparatus of another embodiment.
Figure 6A:
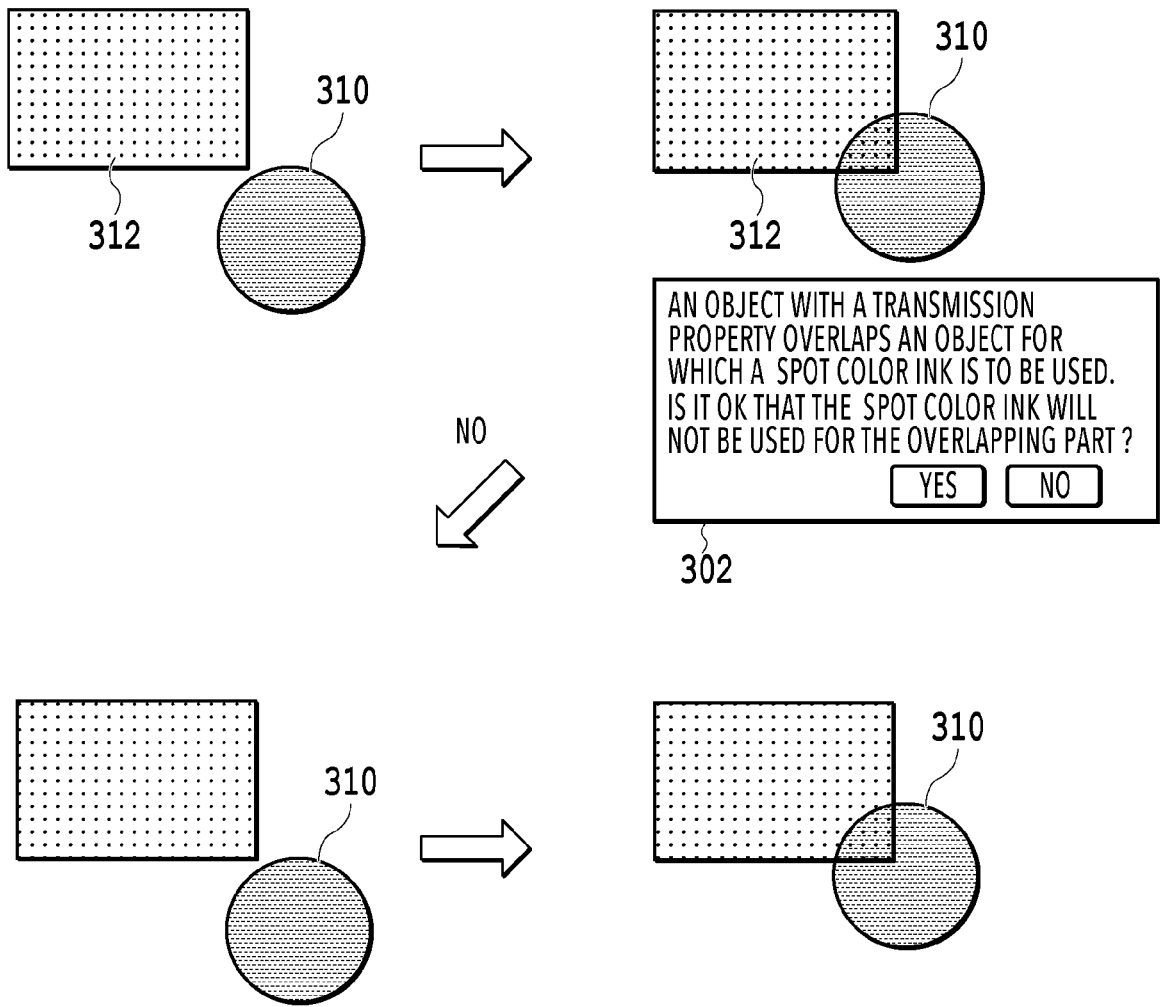
FIG. 6A and FIG. 6B are diagrams illustrating examples in which a warning dialog box is displayed in the information processing apparatus of another embodiment.
Figure 6B:
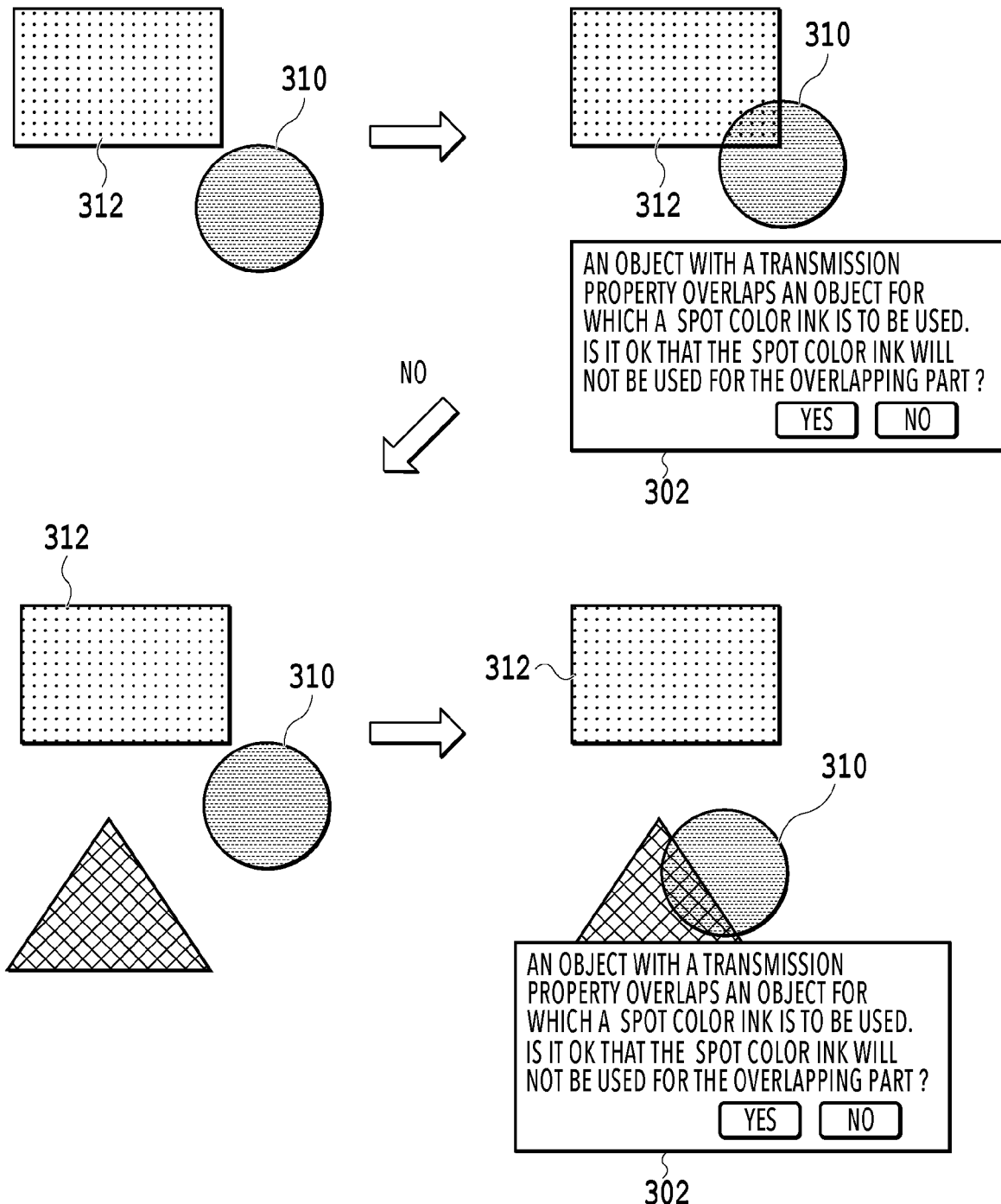

Next, with reference to FIG. 5 to FIG. 6B, an explanation will be given of an information processing apparatus according to the second embodiment. In the following explanation, the same or corresponding configurations as those of the information processing apparatus according to the first embodiment described above are assigned with the same signs as those used in the first embodiment, so as to omit detailed explanations thereof.

The second embodiment is different from the above-described first embodiment in the aspect that the warning dialog box is not displayed if the object which has been returned to the unedited state due to selection in the warning dialog box is moved again so as to be in a state where the same objects overlap again.

Hereinafter, the monitoring processing executed by the information processing apparatus 10 according to the present embodiment will be explained in detail. FIG. 5 is a flowchart illustrating the detailed processing routine of the monitoring processing executed by the information processing apparatus according to the present embodiment. FIG. 6A is a diagram illustrating an example in which the warning dialog box is not displayed again, and FIG. 6B is a diagram illustrating an example in which the warning dialog box is displayed again.

If the monitoring processing is started, the CPU 12 first determines whether or not the position of an object is changed (S502). If it is determined in S502 that the position of an object is not changed, the CPU 12 determines whether or not the application 902 is ended (S504), and, if it is determined that the application 902 is ended, this monitoring processing will be ended. On the other hand, if it is determined in S504 that the application 902 is not ended, the processing will return to S502. Further, if it is determined in S502 that the position of an object is changed, the CPU 12 determines whether or not at least a part of an object with a transmission property is overlapped on the front surface of an object for which a spot color ink is to be used, according to the change (S506). Note that, since the specific details of processing of S502 to S506 are the same as those of S202 to S206 described above, the detailed explanations thereof will be omitted.

If it is determined as "NO" in S506, the processing will proceed to S504. Further, if it is determined as "YES" in S506, the CPU 12 determines whether or not the warning dialog box 302 has already been displayed for the combination of the target objects (S508). In S508, the CPU 12 makes a determination based on the later-described combinations for which the warning dialog box has already been displayed, which are stored in a storage area. For example, the combinations for which the warning dialog box has already been displayed are initialized at the timing of starting the monitoring processing. In S508, if the combination of the target objects (the object with a transmission property and the object for which a spot color ink is to be used that overlap each other) is included in the stored combinations for which the warning dialog box 302 has already been displayed, it will be determined that the warning dialog box 302 has already been displayed. Further, if the combination of the target objects is not included in the stored combinations for which the warning dialog box has been displayed, it will be determined that the warning dialog box 302 has not been displayed.

If it is determined in S508 that the warning dialog box 302 has already been displayed for the combination of the target objects, the processing will proceed to S504. That is, in this case, the CPU 12 determines that the object with a transmission property and the object for which a spot color ink is to be used are overlapped again in the same combination (see FIG. 6A), and thus it is determined that the user executed the editing while being aware of the warning of the warning dialog box 302. Therefore, the displaying of the warning dialog box 302 in this case will be omitted. Further, if it is determined in S508 that the warning dialog box 302 has not been displayed for the combination of the target objects, the CPU 12 will display the warning dialog box 302 (S510). That is, in this case, the CPU 12 determines that the two objects are in a state of being overlapped for the first time due to the movement of an object which is detected in S502 (see FIG. 6B) and displays the warning dialog box 302.

Thereafter, the CPU 12 determines whether or not the "YES" select button 304a displayed in the warning dialog box 302 is selected (S512). In S512, if the "YES" select button 304a is selected, the executed editing is enabled, and the state in which the object with a transmission property is overlapped on the front surface of the object for which a spot color ink is to be used is maintained, and the processing will proceed to S516, which will be described later. Further, if it is determined in S512 that the "YES" select button 304a is not selected, the CPU 12 disables the executed editing and returns the moved object to the position before the movement (S514). The specific details of processing of S512 and S514 are the same as those of S210 and S212 described above. Further, the CPU 12 stores the combination of the target objects at the time of displaying the warning dialog box 302 as a combination for which the warning dialog has been displayed in a storage area such as the RAM 16 (S516), and the processing will proceed to S504.

Specifically, in S516, in a case where the object 310 with a transmission property is moved to the front surface of the object 312 for which a spot color ink is to be used as in FIG. 3A, the combination of the objects 310 and 312 is stored as a combination for which the warning dialog box has been displayed. Further, in a case where the object 314 is moved as in FIG. 3B, the combination of the objects 310, 312, and 314 is stored as a combination for which the warning dialog box has been displayed. Therefore, in such a case as in FIG. 3B, whether or not the warning dialog box 302 has been displayed is determined in S508 according to the moved object and the combination of the overlapped two objects. Note that combinations of objects to be stored as a combination for which the warning dialog has been displayed are not limited to such a combination as described above and may be changed as appropriate.

As explained above, in the information processing apparatus 10 according to the present embodiment, the warning dialog box 302 is not displayed again, that is, a notification for warning or the like is not provided again, for combinations of objects for which the warning dialog box 302 has been displayed. Accordingly, in addition to the effect of the above-described first embodiment, it is possible to minimize the deterioration in workability of editing due to the displaying of the warning dialog box 302.

Third Embodiment

Figure 7:
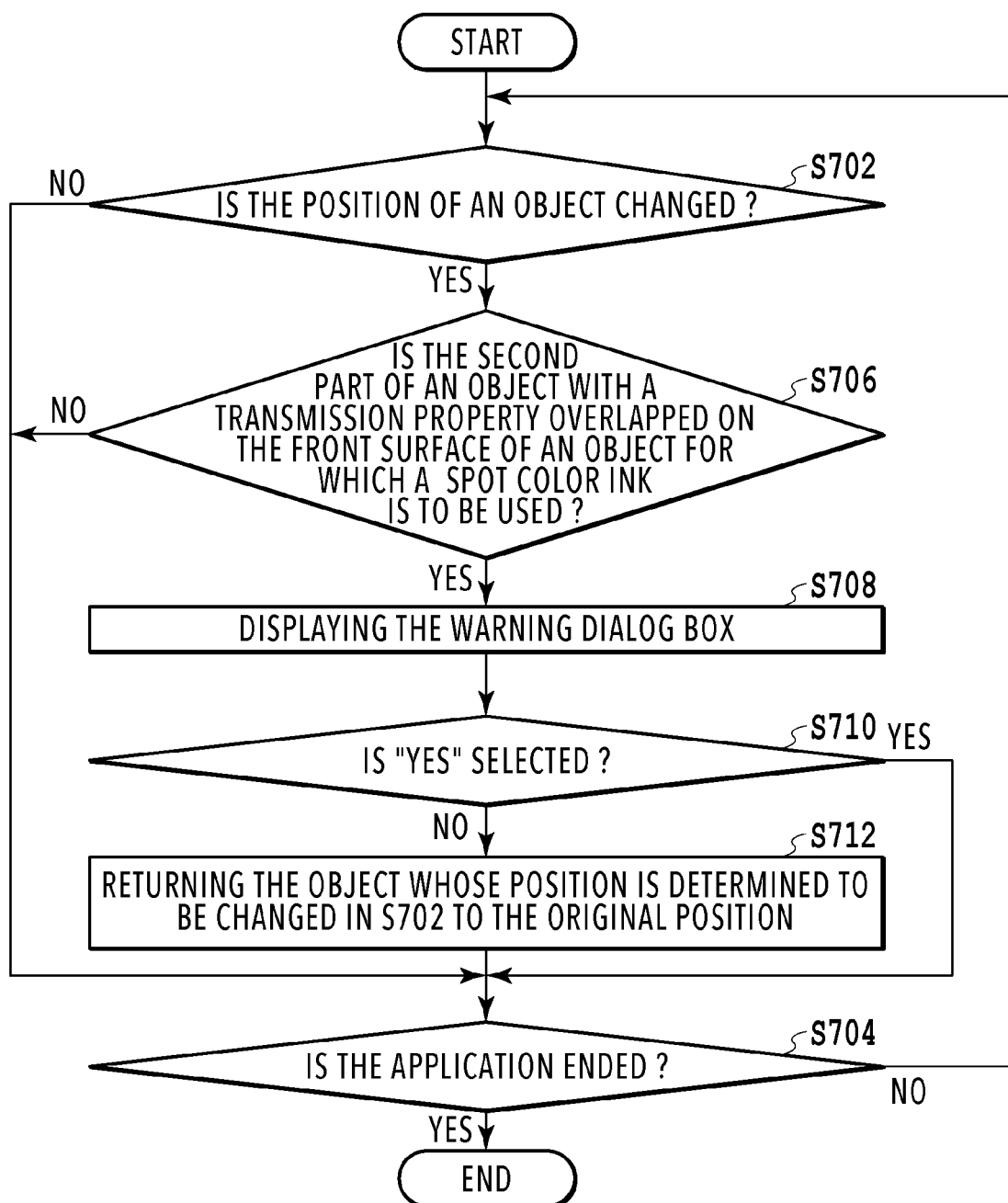
FIG. 7 is a flowchart of monitoring processing performed by an information processing apparatus of another embodiment.

Next, with reference to FIG. 7 to FIG. 8B, an explanation will be given of an information processing apparatus according to the third embodiment. In the following explanation, the same or corresponding configurations as those of the information processing apparatus according to the first embodiment described above are assigned with the same signs as those used in the first embodiment, so as to omit detailed explanations thereof.

The third embodiment is different from the first embodiment in the aspect that the warning dialog box is displayed according to the position of the object with a transmission property overlapping the object for which a spot color ink is to be used, which is configured with the first part and the second part. Note that the first part is a part having a color and transmission property that do not affect the object located on the back surface thereof at the time of being displayed on the editing screen, such as colorless and transparent part with which the object located on the back surface thereof can be properly recognized. The second part is a part having a color and transmission property that affect the object located on the back surface thereof. That is, in an object with a transmission property, the first part is a part that does not affect the printing of an object located on the back surface thereof, and the second part is a part that affects the printing of an object located on the back surface thereof.

Figure 8A:
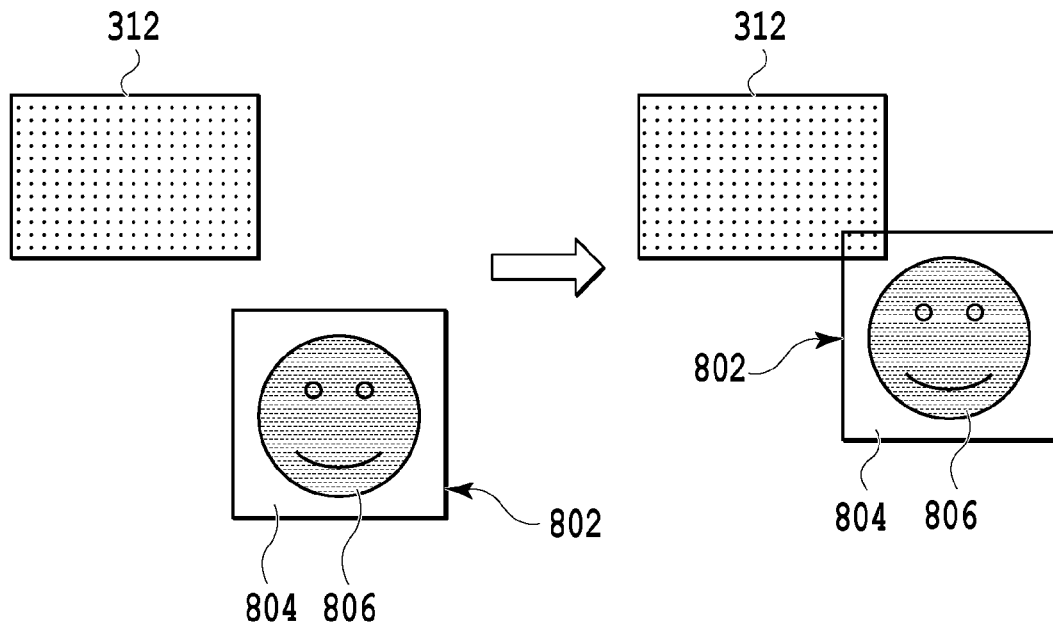
FIG. 8A and FIG. 8B are diagrams illustrating examples in which a warning dialog box is displayed in the information processing apparatus of another embodiment.

Hereinafter, the monitoring processing executed by the information processing apparatus 10 according to the present embodiment will be explained in detail. FIG. 7 is a flowchart illustrating the detailed processing routine of the monitoring processing executed by the information processing apparatus according to the present embodiment. FIG. 8A is a diagram illustrating an example in which the warning dialog box is not displayed, and FIG. 8B is a diagram illustrating an example in which the warning dialog box is displayed.

If the monitoring processing is started, the CPU 12 first determines whether or not the position of an object is changed (S702). If it is determined in S702 that the position of an object is not changed, the CPU 12 determines whether or not the application 902 is ended (S704), and, if it is determined that the application 902 is ended, this monitoring processing will be ended. On the other hand, if it is determined in S704 that the application 902 is not ended, the processing will return to S702. The specific details of processing of S702 and S704 are the same as those of S202 and S204 described above.

Further, if it is determined in S702 that the position of an object is changed, the CPU 12 determines whether or not the second part of an object with a transmission property is overlapped on the front surface of an object for which a spot color ink is to be used, according to the change (S706). Specifically, in S706, first, whether or not two objects that overlap each other has occurred due to the movement of an object is determined. At this stage, in a case where the CPU 12 determines that two objects that overlap each other have not occurred, it will be determined as "NO" in S706. In a case where it is determined that two objects that overlap each other have occurred, whether or not one of the overlapping objects is an object with a transmission property and the other is an object for which a spot color ink is to be used will be determined next. At this stage, in a case where the CPU 12 determines that at least one of the two is not an object with a transmission property or at least the other is not an object for which a spot color ink is to be used, it will be determined as "NO" in S706.

In a case where it is determined that one of the two is an object with a transmission property and the other is an "object for which a spot color ink is to be used", whether or not the object with a transmission property is arranged on the front side of the "object for which a spot color ink is to be used" will be determined next. At this stage, in a case where the CPU 12 determines that the object with a transmission property is not arranged on the front side of the "object for which a spot color ink is to be used", it will be determined as "NO" in S706. In a case where it is determined that an object with a transmission property is arranged on the front side of an object for which a spot color ink is to be used, whether or not the second part of the object with a transmission property overlaps the object for which a spot color ink is to be used will be determined next. At this stage, in a case where it is determined by the CPU 12 that the second part of the object with a transmission property does not overlap the object for which a spot color ink is to be used, that is, in a case where it is determined that only the first part overlaps the object for which a spot color ink is to be used, it will be determined as "NO" in S706.

Therefore, in S706, it will be determined as "YES" if the following four conditions are satisfied. The first condition is that two objects overlapping each other has occurred due to the movement of an object. The second condition is that one of the two overlapping objects is an object with a transmission property and the other is an object for which a spot color ink is to be used. The third condition is that the object with a transmission property is arranged on the front side of the "object for which a spot color ink is to be used". The fourth condition is that the second part of the object with a transmission property overlaps the "object for which a spot color ink is to be used".

If it is determined as "NO" in S706, the processing will proceed to S704. Further, if it is determined as "YES" in S706, the CPU 12 will display the warning dialog box 302 (S708). For example, in a case where only the first part 804 of the object 802 with a transmission property is arranged on the front surface of the object 312 for which a spot color ink is to be used as in FIG. 8A, the area where the two objects overlap has no effect on rendering. That is, with no deviation from the color information that is set for the spot color ink at the time of rendering, the printing by use of the spot color ink will be executed in the area where the first part 804 of the object 802 and the object 312 overlap. On the other hand, in a case where the second part 806 of the object 802 is overlapped on the front surface of the object 312 as in FIG. 8B, there will be deviation from the color information that is set for the spot color ink at the time of rendering in the area of the object 312 where the second part 806 overlaps. That is, the spot color ink will not be used for the printing in the area where the second part 806 of the object 802 and the object 312 overlap.

Figure 8B:
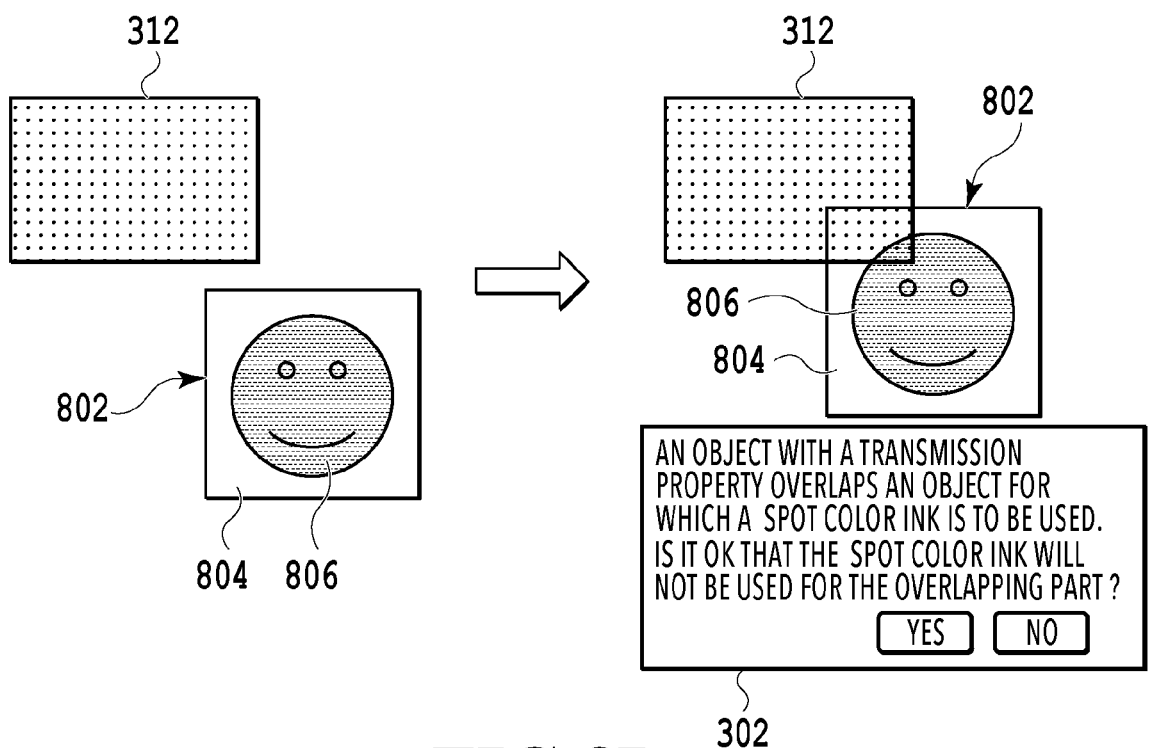

Therefore, in the present embodiment, if the second part of an object with a transmission property is arranged on the front surface of an object for which a spot color ink is to be used as in FIG. 8B, the warning dialog box 302 will be displayed so as to notify the user of the warning and prompt the user to select enabling or disabling the editing. Note that, also in the present embodiment, as with the first embodiment, if the second part of an object with a transmission property is in a state of being overlapped on the front surface of an object for which a spot color ink is to be used due to the movement of a predetermined object, the warning dialog box 302 will be displayed.

Thereafter, the CPU 12 determines whether or not the "YES" select button 304a displayed in the warning dialog box 302 is selected (S710). In S710, if it is determined that the "YES" select button 304a is selected, the executed editing is enabled, and the state in which the second part of the object with a transmission property is overlapped on the front surface of the object for which a spot color ink is to be used is maintained, and the processing will proceed to S704. Further, if it is determined in S710 that the "YES" select button 304a is not selected, the CPU 12 disables the executed editing and returns the moved object to the position before the movement (S712). The specific details of processing of S710 and S712 are the same as those of S210 and S212 described above.

As explained above, in the information processing apparatus 10, if the second part of an object with a transmission property, which affects the printing of an object on the back surface thereof, is overlapped on the front surface of an object for which a spot color ink is to be used, the warning dialog box 302 will be displayed. Further, if only the first part of an object with a transmission property, which does not affect the printing of an object on the back surface thereof, is overlapped on the front surface of an object for which a spot color ink is to be used, the warning dialog box 302 will not be displayed. Accordingly, in addition to the effect of the above-described first embodiment, the effect of improving the convenience for editing can be obtained.

Other Embodiments

Note that the above-described embodiments may be modified as shown in the following (1) through (4).

(1) In the above-described embodiments, although the case in which an object with a transmission property overlaps the front surface of an object for which a spot color ink is to be used, where the warning dialog box will be displayed, is made by the change of the position of an object, there is not a limitation as such. Specifically, it is also possible that the warning dialog box 302 is displayed in a case where an object with a transmission property overlaps the front surface of an object for which a spot color ink is to be used due to another editing processing such as enlarging or reducing and adding or deleting an object. That is, as a result of editing in various ways, if an object with a transmission property is displayed in a state of being overlapped on the front surface of an object for which a spot color ink is to be used, the warning dialog box 302 will be displayed. In this case, if the "NO" select button 304b is selected in the warning dialog box 302, the edited object is returned to the unedited state in S212 or in a process corresponding thereto. Further, if the "YES" select button 304a is selected, the edit is maintained.

(2) Although the warning dialog box 302 which includes the warning message 306, the sentence 308 for asking whether editing is possible, i.e., whether editing will be enabled or disabled, and the select button 304 is displayed in the above-described embodiments, there is not a limitation as such. That is, it is also possible that at least one of the warning message 306 and the sentence 308 is displayed as the warning dialog box or that the edited object is returned to the unedited state at the user's discretion.

(3) Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

(4) The above-described embodiments and various forms shown in (1) through (3) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-070475, filed Apr. 19, 2021, which is hereby incorporated by reference herein in its entirety.

What is claimed is:

1. An information processing method comprising:
   editing an object that is displayed on a display device;
   changing the displaying on the display device based on contents of the editing; and
   executing at least one of a first type notification or a second type notification via the display device, based on a fact that, by the editing of the object, an object with a transmission property is overlapped on a front surface of an object to be printed by use of a spot color ink,
   wherein the first type notification is provided for warning that the object with the transmission property is in a state of being overlapped on the front surface of the object to be printed by use of the spot color ink, and
   wherein the second type notification is provided for asking whether or not a predetermined overlapping state in which the object with the transmission property is overlapped on the front surface of the object to be printed by use of the spot color ink is to be maintained.

2. The information processing method according to claim 1, wherein, in the second type notification, an option corresponding to whether or not the predetermined overlapping state is to be maintained is displayed.

3. The information processing method according to claim 2, wherein, in a case where an option corresponding to not maintaining the predetermined overlapping state is selected by a user, at least one of (a) the object with the transmission property and (b) the object to be printed by use of the spot color ink is returned to an unedited state.

4. The information processing method according to claim 1, wherein, a combination of the objects, which are regarded as targets for the at least one of the first type notification or the second type notification, are stored, and
   wherein the at least one of the first type notification or the second type notification is not provided again based on the stored combination.

5. The information processing method according to claim 1, wherein the object with the transmission property includes (a) a first part that does not affect printing of an object located on a back surface thereof or (b) a second part that affects printing on the object located on the back surface thereof, and wherein at least one of the first type notification or the second type notification is executed, based on a fact that the second part of the object with the transmission property is overlapped on the front surface of the object to be printed by use of the spot color ink by the editing of the object.

6. The information processing method according to claim 1 further comprising outputting image data reflecting the contents of the editing to a printing apparatus that is capable of printing by use of the spot color ink at least.

7. The information processing method according to claim 1, wherein the editing includes at least one of moving, enlarging, reducing, adding, and deleting the object.

8. The information processing method according to claim 1, wherein the spot color ink is ink whose color expressed in the printing cannot be displayed on the display device.

9. The information processing method according to claim 8, wherein the spot color ink includes ink that expresses at least one of a fluorescent color, a gold color, and a silver color.

10. The information processing method according to claim 1, wherein neither the first type notification nor the second type notification is executed based on a fact that the object to be printed by use of the spot color ink is overlapped on a front surface of the object with the transmission property.

11. The information processing method according to claim 1, wherein neither the first type notification nor the second type notification is executed based on a fact that an object without the transmission property is overlapped on the front surface of the object to be printed by use of the spot color ink.

12. The information processing method according to claim 1, wherein neither the first type notification nor the second type notification is executed based on a fact that the object with the transmission property is overlapped on a front surface of an object to be printed by use of a normal ink which is not the spot color ink.

13. The information processing method according to claim 12, wherein the normal ink is at least one of a cyan ink, a magenta ink, a yellow ink, and a black ink.

14. An information processing apparatus comprising:
(a) at least one processor and at least one memory, (b) circuitry, or (c) circuitry, at least one processor, and at least one memory, the (a) at least one processor and at least one memory, (b) circuitry, or (c) circuitry, at least one processor, and at least one memory being configured to operate as a plurality of units comprising:
(1) an editing unit configured to be capable of editing an object that is displayed on a display device;
(2) a display control unit configured to change the displaying on the display device, based on contents of the editing by the editing unit; and
(3) a notification unit configured to provide at least one of a first type notification or a second type notification via the display device, based on a fact that, by the editing of the object by the editing unit, an object with a transmission property is overlapped on a front surface of an object to be printed by use of a spot color ink,
wherein the first type notification is provided for warning that the object with the transmission property is in a state of being overlapped on the front surface of the object to be printed by use of the spot color ink, and
wherein the second type notification is provided for asking whether or not a predetermined overlapping state in which the object with the transmission property is overlapped on the front surface of the object to be printed by use of the spot color ink is to be maintained.

15. A non-transitory computer-readable storage medium storing a program for causing a computer to function as an information processing apparatus, the information processing apparatus comprising:
an editing unit configured to be capable of editing an object that is displayed on a display device;
a display control unit configured to change the displaying on the display device, based on contents of the editing by the editing unit; and
a notification unit configured to provide at least one of a first type notification or a second type notification via the display device, based on a fact that, by the editing of the object by the editing unit, an object with a transmission property is overlapped on a front surface of an object to be printed by use of a spot color ink,
wherein the first type notification is provided for warning that the object with the transmission property is in a state of being overlapped on the front surface of the object to be printed by use of the spot color ink, and
wherein the second type notification is provided for asking whether or not a predetermined overlapping state in which the object with the transmission property is overlapped on the front surface of the object to be printed by use of the spot color ink is to be maintained.

* * * * *